US010760493B2

(12) United States Patent
Thomas

(10) Patent No.: US 10,760,493 B2
(45) Date of Patent: Sep. 1, 2020

(54) HEAT EXCHANGER FLOW CONTROL ASSEMBLY

(71) Applicant: United Technologies Corporation, Farmington, CT (US)

(72) Inventor: Michael R. Thomas, Bloomfield, CT (US)

(73) Assignee: RAYTHEON TECHNOLOGIES CORPORATION, Farmington, CT (US)

(*) Notice: Subject to any disclaimer, the term of this patent is extended or adjusted under 35 U.S.C. 154(b) by 536 days.

(21) Appl. No.: 15/105,167

(22) PCT Filed: Dec. 15, 2014

(86) PCT No.: PCT/US2014/070235
§ 371 (c)(1),
(2) Date: Jun. 16, 2016

(87) PCT Pub. No.: WO2015/138020
PCT Pub. Date: Sep. 17, 2015

(65) Prior Publication Data
US 2016/0312702 A1 Oct. 27, 2016

Related U.S. Application Data

(60) Provisional application No. 61/917,386, filed on Dec. 18, 2013.

(51) Int. Cl.
*F02C 7/18* (2006.01)
*F28F 27/02* (2006.01)
(Continued)

(52) U.S. Cl.
CPC ............... *F02C 7/18* (2013.01); *F02C 7/185* (2013.01); *F28F 13/06* (2013.01); *F28F 27/02* (2013.01);
(Continued)

(58) Field of Classification Search
CPC .... F02C 7/14; F02C 7/141; F02C 7/18; F02C 7/185; F02C 6/08; F02C 9/18;
(Continued)

(56) References Cited

U.S. PATENT DOCUMENTS 4,779,644 A * 10/1988 Benson ................. B64D 13/00
137/606
5,123,242 A * 6/1992 Miller ....................... F02C 7/14
165/300
(Continued)

FOREIGN PATENT DOCUMENTS

DE  102010011372   10/2010
EP  2620618        7/2013
(Continued)

OTHER PUBLICATIONS

Supplementary European Search Report for Application No. 14885567.9 dated Jul. 24, 2017.
(Continued)

Primary Examiner — Andrew H Nguyen
(74) Attorney, Agent, or Firm — Carlson, Gaskey & Olds, P.C.

(57) ABSTRACT

An example flow control assembly includes a door that is moved to control flow through a heat exchanger, and a pneumatic device to move the door.

19 Claims, 8 Drawing Sheets

(51) Int. Cl.
*F28F 13/06* (2006.01)
*F28D 21/00* (2006.01)

(52) U.S. Cl.
CPC .... *F05D 2260/213* (2013.01); *F05D 2260/57* (2013.01); *F05D 2260/606* (2013.01); *F05D 2270/65* (2013.01); *F28D 2021/0021* (2013.01); *F28D 2021/0026* (2013.01); *F28F 2250/06* (2013.01); *Y02T 50/672* (2013.01); *Y02T 50/676* (2013.01)

(58) Field of Classification Search
CPC .......... F02K 3/075; F02K 3/077; F02K 3/115; F05D 2260/213; F05D 2270/65; F28F 27/02; F28F 9/22; F28F 2009/226
See application file for complete search history.

(56) References Cited

U.S. PATENT DOCUMENTS

| | | | | |
|---|---|---|---|---|
| 5,317,867 | A * | 6/1994 | Tonks | F02K 3/075 60/226.3 |
| 5,351,476 | A | 10/1994 | Laborie et al. | |
| 6,109,018 | A * | 8/2000 | Rostrup-Nielsen | F01N 3/2013 60/723 |
| 6,189,608 | B1 * | 2/2001 | Bodas | B60K 11/085 165/300 |
| 7,810,312 | B2 | 10/2010 | Stretton et al. | |
| 8,266,889 | B2 | 9/2012 | Coffinberry | |
| 8,418,471 | B2 | 4/2013 | Baltas | |
| 8,522,592 | B2 | 9/2013 | Sakae | |
| 2007/0193277 | A1 | 8/2007 | Sheoran et al. | |
| 2008/0314060 | A1 | 12/2008 | Parikh | |
| 2009/0097972 | A1 * | 4/2009 | Murphy | F02C 7/14 415/178 |
| 2009/0111370 | A1 | 4/2009 | Porte et al. | |
| 2009/0169359 | A1 | 7/2009 | Murphy et al. | |
| 2012/0128467 | A1 * | 5/2012 | Ruthemeyer | F01D 5/146 415/115 |
| 2012/0168115 | A1 * | 7/2012 | Raimarckers | F01D 25/02 165/41 |
| 2012/0180501 | A1 * | 7/2012 | Army | B64D 13/08 60/796 |
| 2013/0247587 | A1 * | 9/2013 | Lo | F01D 17/105 60/806 |
| 2014/0208761 | A1 * | 7/2014 | Skilton | B64D 33/08 60/772 |
| 2014/0341708 | A1 * | 11/2014 | Dierksmeier | F02C 9/18 415/1 |
| 2015/0152789 | A1 * | 6/2015 | Thomas | F02C 9/18 415/144 |
| 2017/0284303 | A1 * | 10/2017 | Johnson | B64D 13/08 |

FOREIGN PATENT DOCUMENTS

| | | |
|---|---|---|
| JP | 4517460 | 8/2010 |
| WO | 2011139311 | 11/2011 |

OTHER PUBLICATIONS

International Search Report and Written Opinion for Application No. PCT/US2014/070235 dated Sep. 25, 2015.
International Preliminary Report on Patentability for Application No. PCT/US2014/070235 dated Jun. 30, 2016.

\* cited by examiner

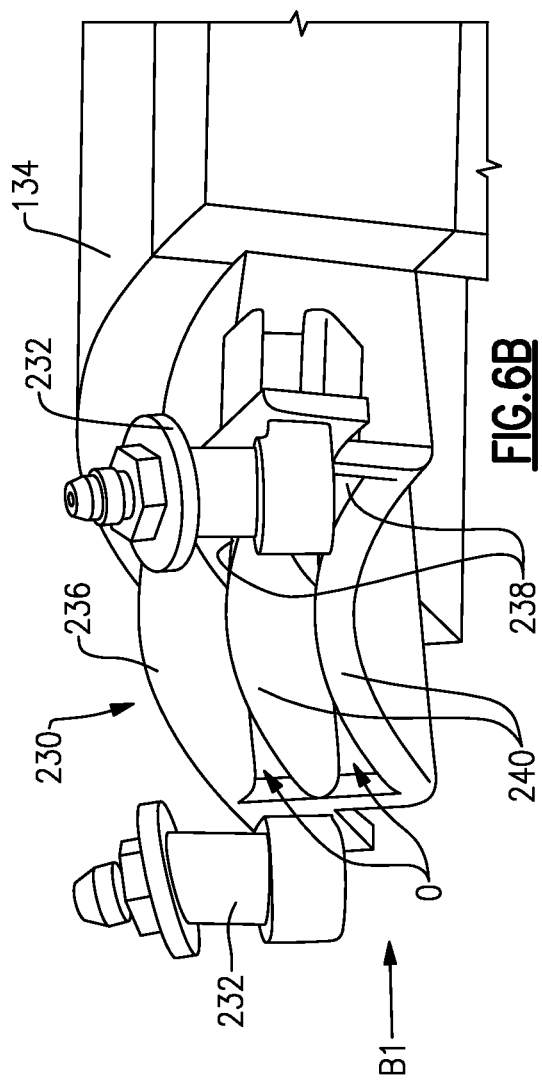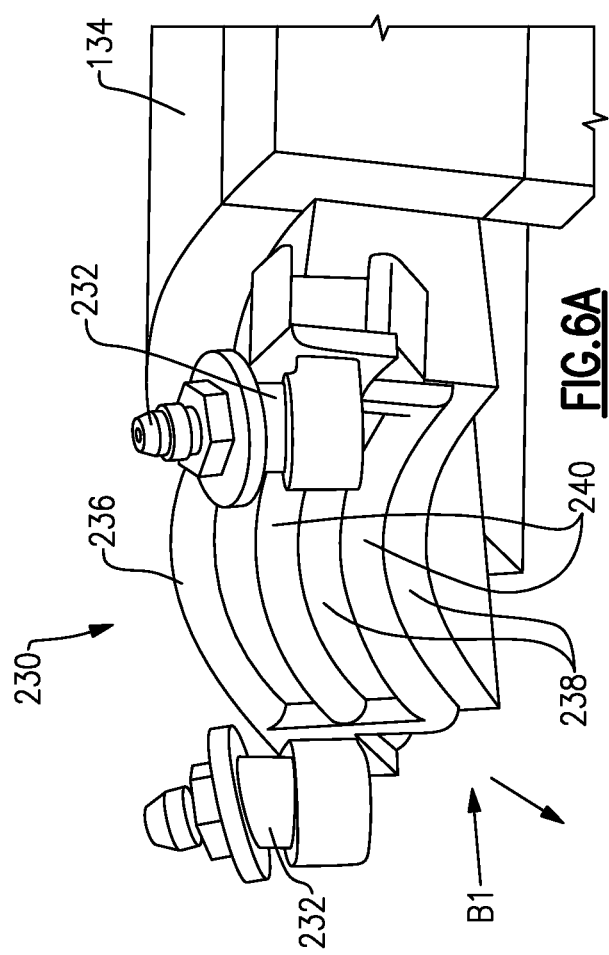

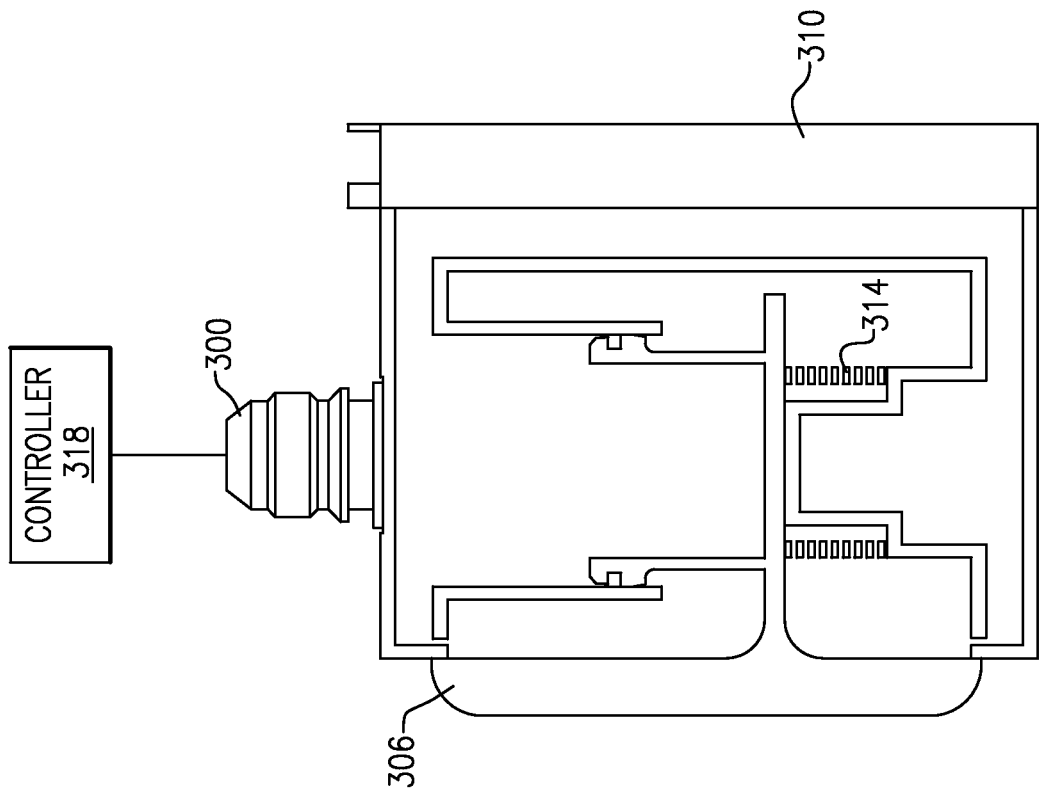
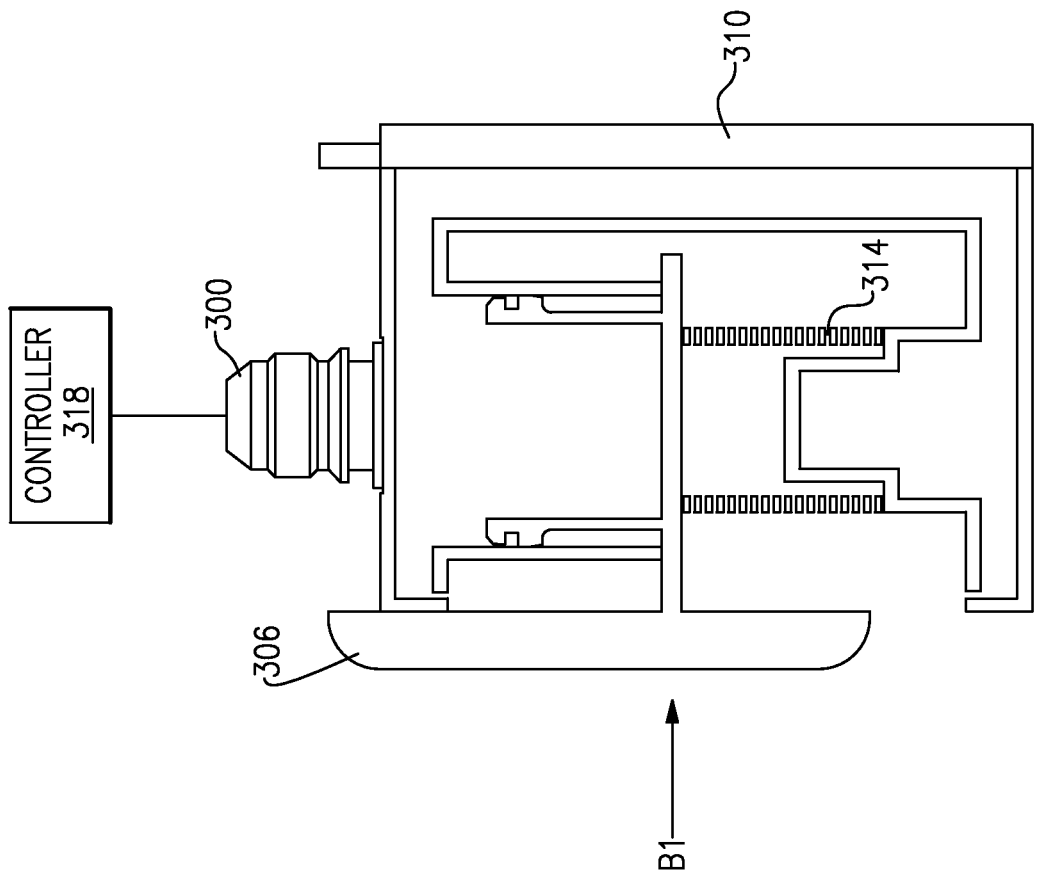

HEAT EXCHANGER FLOW CONTROL ASSEMBLY

CROSS-REFERENCE TO RELATED APPLICATION

This application claims priority to U.S. Provisional Application No. 61/917,386 filed on Dec. 18, 2013.

STATEMENT REGARDING GOVERNMENT SUPPORT

This invention was made with government support under Contract No. FA-8650-09-D-2923-AETD awarded by the United States Air Force. The Government has certain rights in this invention.

BACKGROUND

This disclosure relates to a door for a heat exchanger and, more particularly, to a door that is actuated to selectively communicate flow through the heat exchanger.

Gas turbine engines are known and, typically, include a fan delivering air into a bypass duct as propulsion air and to be utilized to cool components. The fan also delivers air into a core engine where it is compressed in a compressor, then delivered into a combustion section where it is mixed with fuel and ignited. Products of the combustion pass downstream over turbine rotors, driving them to rotate.

One type of gas turbine engine has multiple bypass streams. Thus, there is a radially outer third stream bypass flow and a radially inner main bypass flow. Other types of gas turbine engines have other bypass flow arrangements. Bypass flows may be utilized for cooling heat exchangers and other components. Cooling the heat exchangers may not be necessary at all stages of engine operation.

SUMMARY

A flow control assembly according to an exemplary aspect of the present disclosure includes, among other things, a door that is moved to control flow through a heat exchanger, and a pneumatic device to move the door.

In another example of the foregoing flow control assembly, the door is at an inlet to the heat exchanger.

In another example of any of the foregoing flow control assemblies, the pneumatic device is configured to move the door from a position that permits more flow through the heat exchanger to a position that permits less flow through the heat exchanger.

In another example of any of the foregoing flow control assemblies, the assembly includes a spring configured to move the door from the position that permits less flow through the heat exchanger to the position that permits more flow through the heat exchanger.

In another example of any of the foregoing flow control assemblies, the pneumatic device is configured to move the door from a position that permits less flow through the heat exchanger to a position that permits more flow through the heat exchanger.

In another example of any of the foregoing flow control assemblies, the assembly includes a spring configured to move the door from the position that permits more flow through the heat exchanger to the position that permits less flow through the heat exchanger.

In another example of any of the foregoing flow control assemblies, the pneumatic device comprises a first expandable pneumatic chamber positioned on a first circumferential side of the heat exchanger and a second expandable pneumatic chamber positioned on a second circumferential side of the heat exchanger.

In another example of any of the foregoing flow control assemblies, the door comprises a plurality of arcuate louvers.

In another example of any of the foregoing flow control assemblies, the door is configured to move along a radially extending axis of a turbomachine to control flow through the heat exchanger.

A gas turbine engine according to another exemplary aspect of the present disclosure includes, among other things, a fan to deliver air into a main bypass flow outer housing, and into a third stream bypass flow outer housing that is radially outwardly of the main bypass flow outer housing. A core engine outer housing is radially inward of said main bypass flow outer housing. The core engine outer housing encloses a compressor section and a turbine section. The engine further includes at least one duct of the main bypass flow outer housing. The at least one duct extends radially outwardly into the third stream bypass flow to provide additional flow area at the circumferential location of the duct. A heat exchanger is at least partially disposed within the at least one duct. A door is configured to move to control flow through the heat exchanger.

In another example of the foregoing gas turbine engine, the door is configured to move in response to pneumatic pressure.

In another example of any of the foregoing gas turbine engines, compressed air from the compressor section provides the pneumatic pressure.

In another example of any of the foregoing gas turbine engines, the door is positioned at an outlet to the heat exchanger.

In another example of any of the foregoing gas turbine engines, wherein the door is configured to passively move to control flow through the heat exchanger.

In another example of any of the foregoing gas turbine engines, the heat exchanger is configured to communicate thermal energy from an engine core to flow moving through the heat exchanger from the third stream bypass flow.

A method of controlling flow through a heat exchanger of a gas turbine engine according to yet another exemplary aspect of the present disclosure includes, among other things, pressurizing a chamber to move a door, and moving the door to increase or decrease flow through a heat exchanger.

In another example of the foregoing method, the method including circulating thermal energy from a core of a gas turbine engine though the heat exchanger.

In another example of any of the foregoing methods, the method includes circulating bypass flow through the heat exchanger.

In another example of any of the foregoing methods, the method includes pressurizing the chamber to move the door along a radially extending axis of the gas turbine engine.

DESCRIPTION OF THE FIGURES

The various features and advantages of the disclosed examples will become apparent to those skilled in the art from the detailed description. The figures that accompany the detailed description can be briefly described as follows:

FIG. 6A shows a close-up view of a door of the flow control device of FIG. 5 in a flow restricting position.

FIG. 6B shows a close-up view of the flow control device of FIG. 5 in a flow permitting position.

FIG. 8A shows another example flow control device and heat exchanger for use with the engine of FIG. 1 in a flow permitting position.

FIG. 8B shows the flow control device and heat exchanger of FIG. 9B in a flow restricting position.

DETAILED DESCRIPTION

Figure 1:
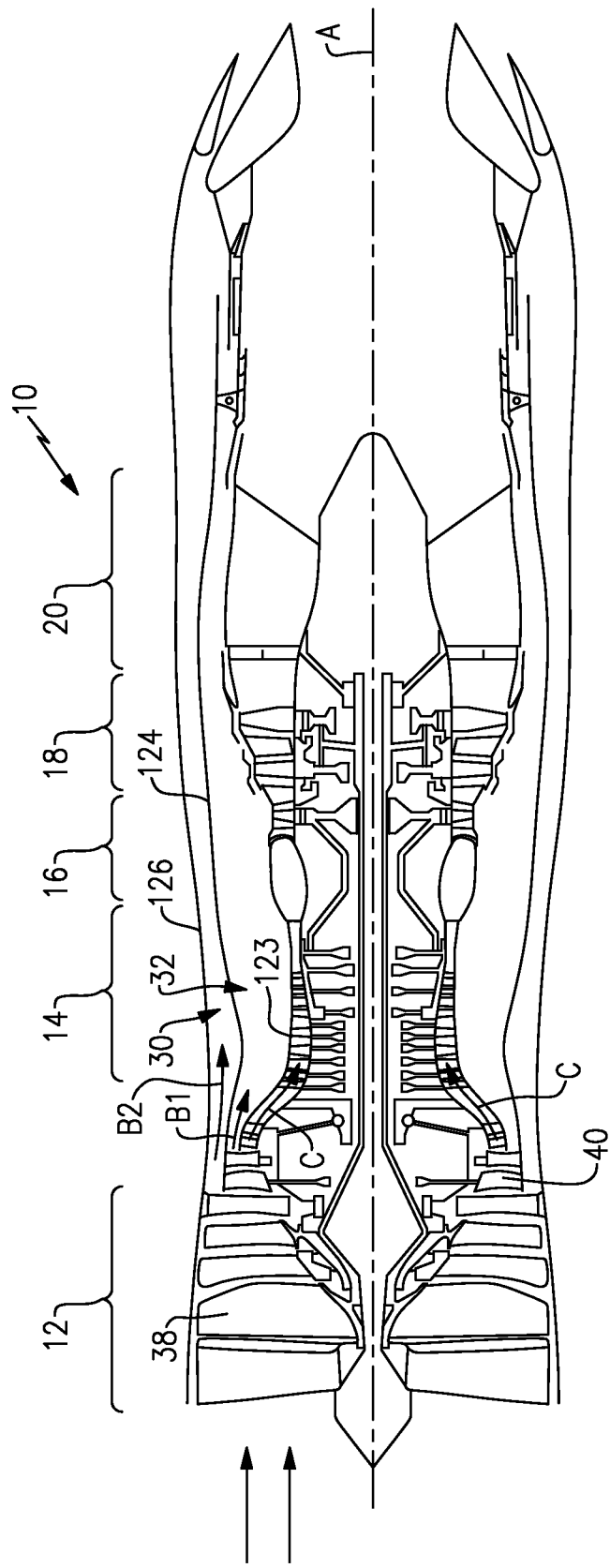
FIG. 1 schematically shows a multiple bypass stream gas turbine engine.

FIG. 1 shows an exemplary engine 10 in a schematic manner. A fan section 12 delivers air C into a core engine including a compressor section 14, a combustor section 16, a turbine section 18, and then outwardly of a nozzle 20. The air is mixed with fuel and ignited in the combustor section 16, and products of that combustion drive turbine rotors in the turbine section 18 to rotatably drive compressor rotors in the compressor section 14, and fan rotors 38 and 40 about an axis A.

The fan rotor 38 delivers air inwardly of a main bypass flow outer housing 124. Radially outwardly of the main bypass outer housing 124 is an outer housing 126. A main bypass flow B1 flows through a main bypass passage 32 inwardly of the main bypass flow outer housing 124, and outwardly of a core engine outer housing 123. A core engine flow C flows into the compressor section 14. The fan rotor 38 delivers air into the main bypass flow B1, the core engine flow C, and a third stream bypass flow B2, in a third stream bypass passage 30. The passage 30 is defined radially outwardly of the main bypass flow outer housing 124, and inwardly of the outer housing 126. A fan rotor 40 further delivers air into the main bypass flow B1, and the core engine flow C.

Figure 2:
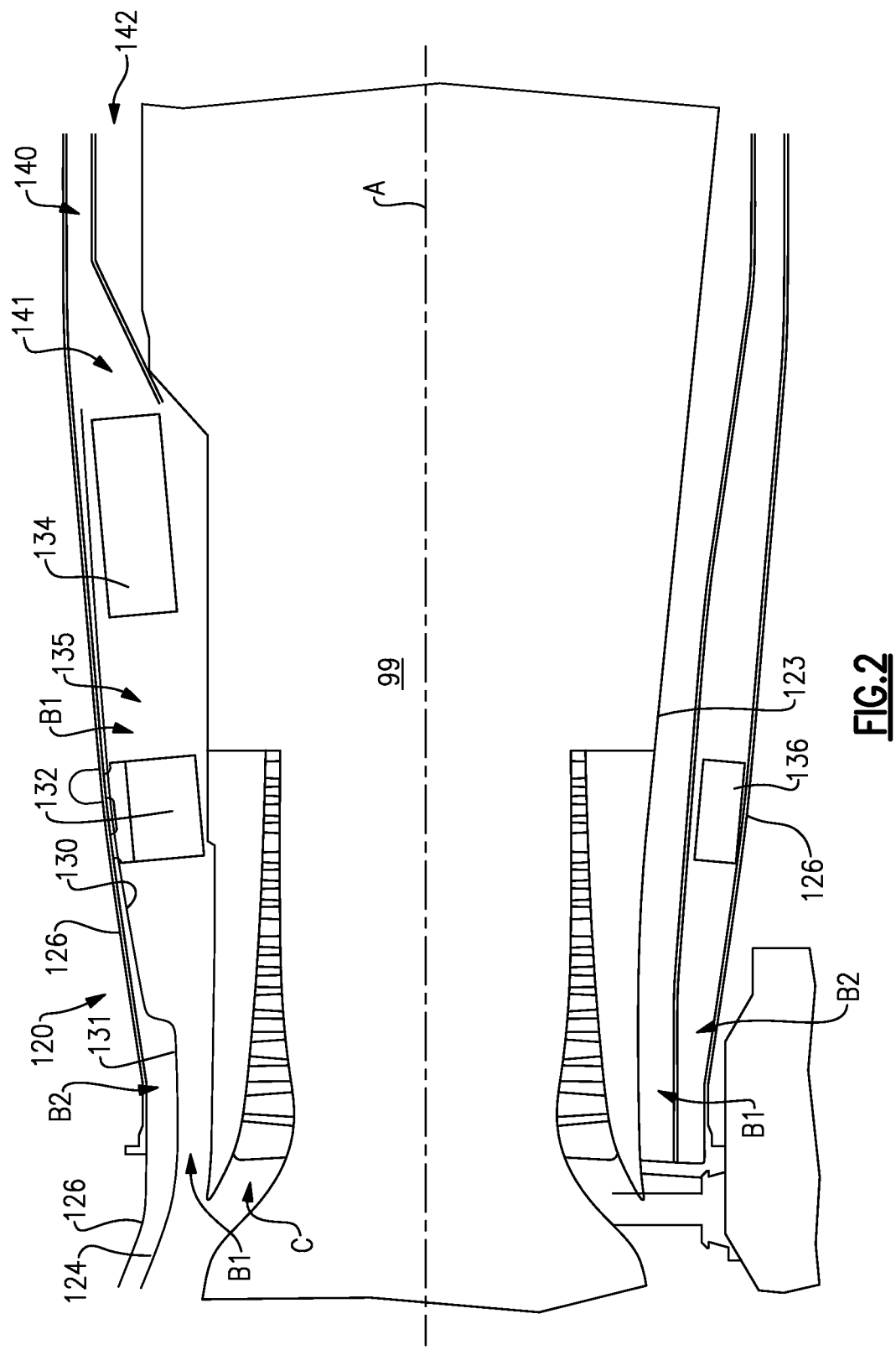
FIG. 2 shows a ducting arrangement for the multiple bypass stream gas turbine engine of FIG. 1.

An engine 120 is illustrated in FIG. 2 and shows the ducting arrangement used in the engine 10 of FIG. 1. The engine 120 is a version of the engine 10. The engine 120 includes a core engine flow C delivering air into the core engine 99. Core engine 99 is shown schematically, but includes the sections 12, 14, 16, 18 and 20 of FIG. 1.

A main bypass flow B1 is defined between the core engine outer housing 123 and the main bypass flow outer housing 124. A third stream bypass flow B2 is defined between an outer surface of the main bypass flow outer housing 124 and an inner surface of an outer housing 126.

The main bypass flow B1 has radially enlarged flow areas 135 defined by ducts 130 that extend radially outwardly from a nominal surface 131 of the main bypass flow outer housing 124. The enlarged flow areas 135 defined by the ducts 130 may receive large heat exchangers such as heat exchangers 132 and 134. Radially smaller heat exchangers, such as heat exchanger 136, may be positioned within the third stream bypass flow B2.

As can be appreciated, even at locations where the ducts 130 extend radially outwardly, the outer housing 126 is still radially outward of the main bypass flow outer housing 124, and the ducts 130.

Each of the ducts 130 defining the enlarged flow areas 135 is shown to have an outlet 141, at which air passing through the enlarged flow areas 135 exits to mix with the third stream bypass flow B2 at 140. The remainder of the main bypass flow would be in passage 142 at this point. Thus, the air, having cooled heat exchangers 132 and 134, next passes to mix with the third stream bypass flow.

Figure 3:
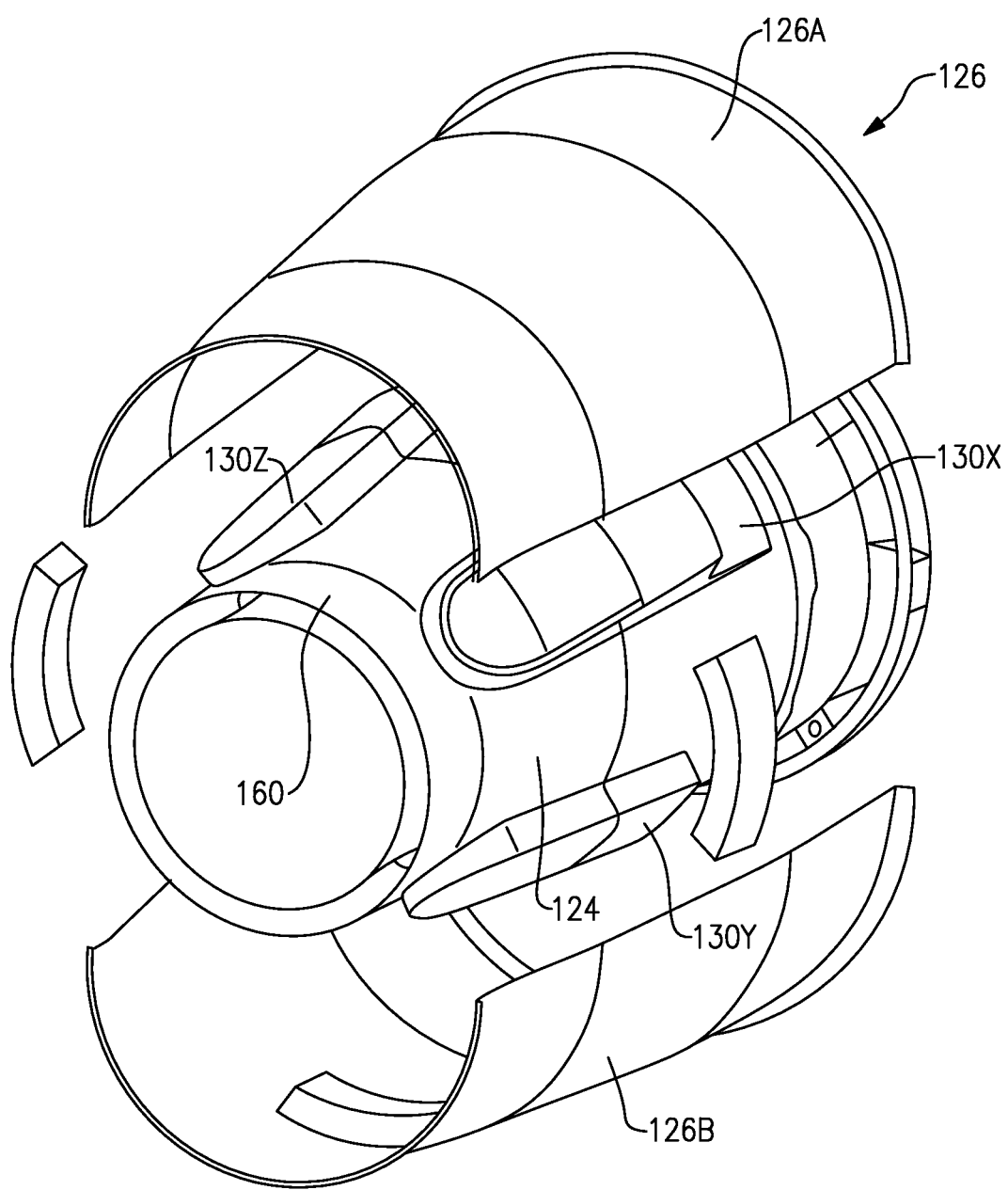
FIG. 3 shows the housing components that will define the outer bypass duct.

As shown in FIG. 3, when assembled, there are a plurality of circumferentially spaced ducts 130X, 130Y and 130Z. In this embodiment, there are three circumferentially spaced ducts illustrated (and a fourth, not shown), however, there could be other numbers such as two. Radially outside the ducts 130X, 130Y, and 130Z is the third stream bypass flow outer housing 126, which includes a pair of portions 126A and 126B surrounding the inner portion of the housing 160

Figure 4A:
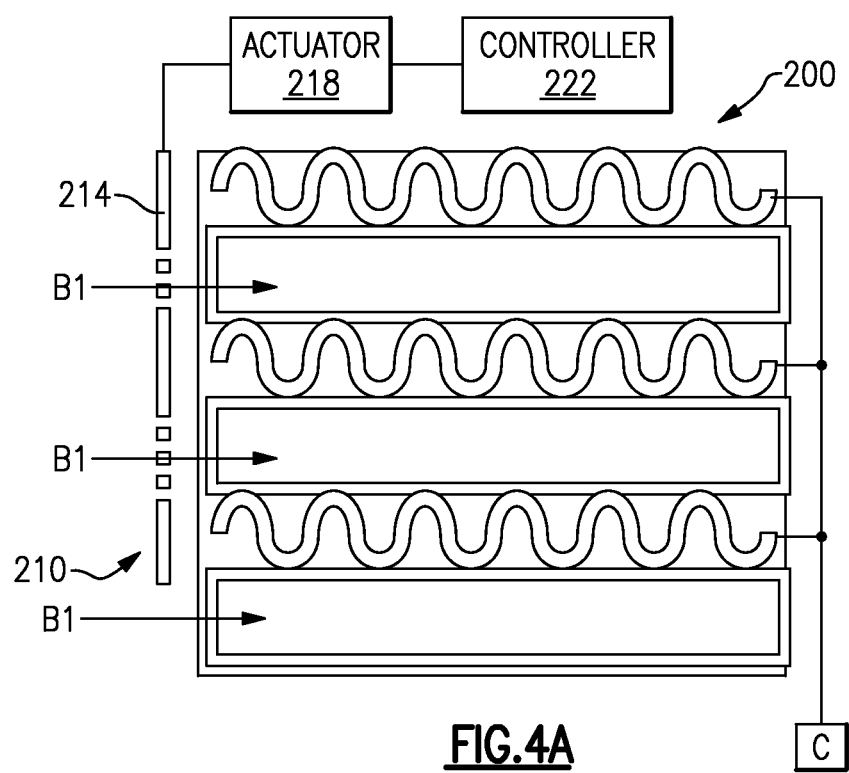
FIG. 4A shows a highly schematic view of an example heat exchanger and flow control assembly of the engine of FIG. 1 in a flow permitting position.
Figure 4B:
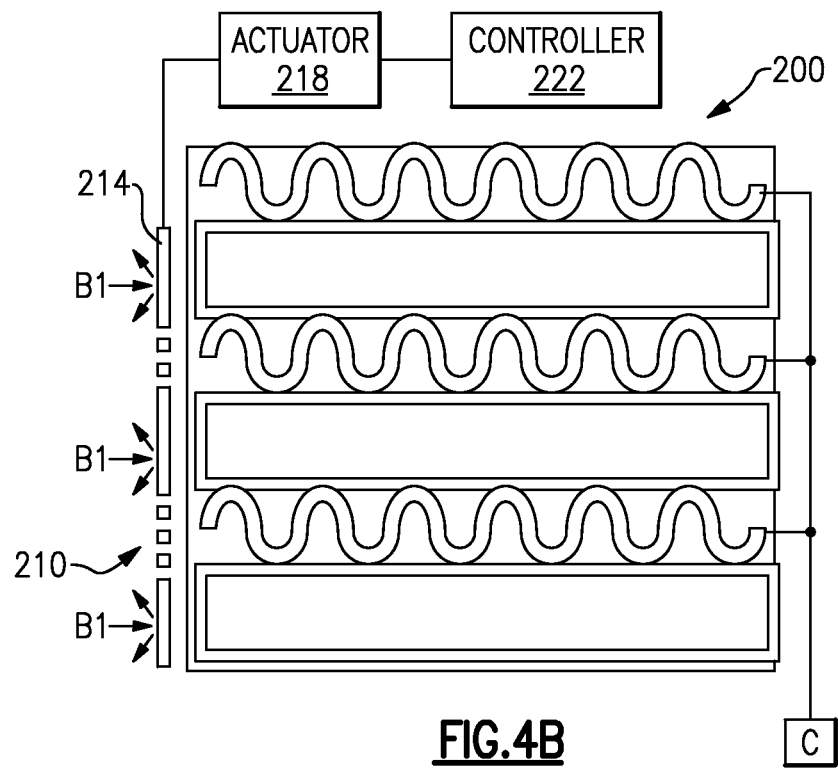
FIG. 4B shows the example heat exchanger and door of FIG. 4A in a flow restricting position.

Referring now to FIGS. 4A and 4B with continuing reference to FIG. 2, a heat exchanger 200 is shown schematically. The heat exchanger 200 can be an example of the heat exchanger 134. In another example, the heat exchanger 200 is an example of the heat exchanger 134, the heat exchanger 136, or another heat exchanger used in connection with another engine.

Air from the main bypass flow B1 selectively moves through the heat exchanger 200. Core engine flow C also moves through the heat exchanger 200. When the bypass flow B1 moves through the heat exchanger 200, thermal energy moves from the core engine flow C within the heat exchanger 200 to the bypass flow B1. The thermal energy is then carried by the bypass flow B1 through the outlet 141. Transferring thermal energy from the core engine flow C to the bypass flow B1 cools the core engine 99.

A flow control assembly 210 is used to control flow of the bypass air B1 through the heat exchanger 200. In this example, the flow control assembly 210 includes a door 214 and an actuator 218. The actuator 218 moves the door 214 in response to commands from a controller 222. The actuator 218 moves the door 214 from a position that permits more flow through the heat exchanger 200 (FIG. 4A) to a position that permits less flow through the heat exchanger 200 (FIG. 4B). In one example, there is substantially no flow of the bypass air B1 through the heat exchanger 200 when the door 214 in the position that permits less flow.

The controller 222 may command the actuator 218 to move the door 214 from a position that permits less flow to a position that permits more flow in order to increase cooling of the core engine 99. The door 214 may be metal, composite, or some other material.

Figure 5:
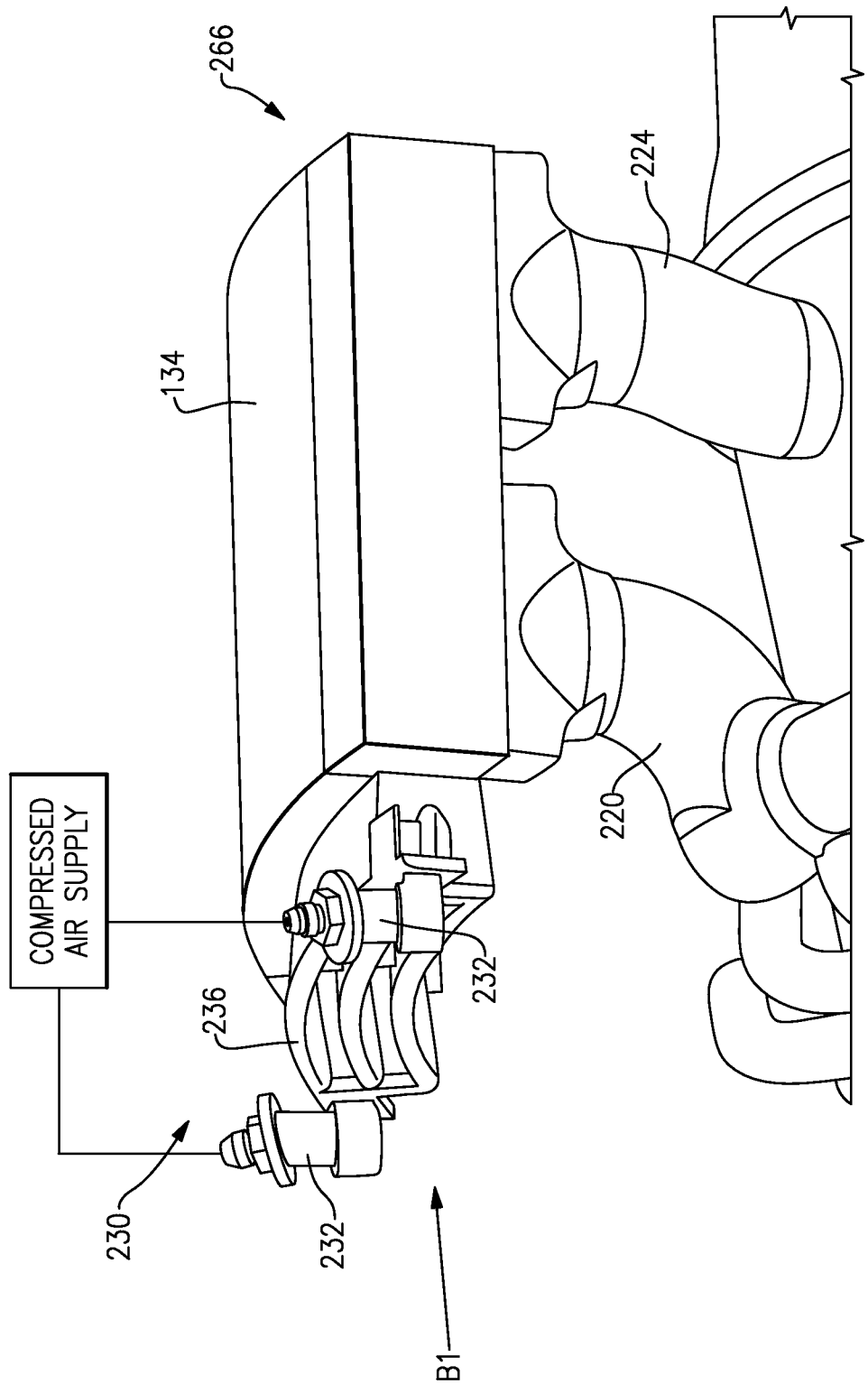
FIG. 5 shows a heat exchanger of the engine of FIG. 1 utilizing a flow control device.

Referring now to FIG. 5 with continued reference to FIG. 2, the heat exchanger 134 receives core air flow C through an inlet conduit 224. Core air moves from the heat exchanger 134 back to the core through an outlet conduit 220. The heat exchanger 134 has an arcuate radial profile to facilitate packaging the heat exchanger 134 within the engine 120.

A flow control device 230 used in connection with the heat exchanger 134 has a corresponding arcuate profile. An actuator of the flow control device 230 is a pneumatic actuator 232 and utilizes air from a compressed air supply to selectively move a door 236 of the flow control device 230 to a position that permits more flow of the bypass air B1 through the heat exchanger 134. A compressor section of the engine 120 may provide the compressed air used within the actuator 232 of the flow control device 230.

To be in the position that permits less flow, the flow control device 230 does not have to be fully closed. To be in the position that permits more flow, the flow control device 230 does not have to be fully open. The positions may comprise positions that block, for example, 25, 50, or 75 percent of flow through the heat exchanger 134.

Figure 7:
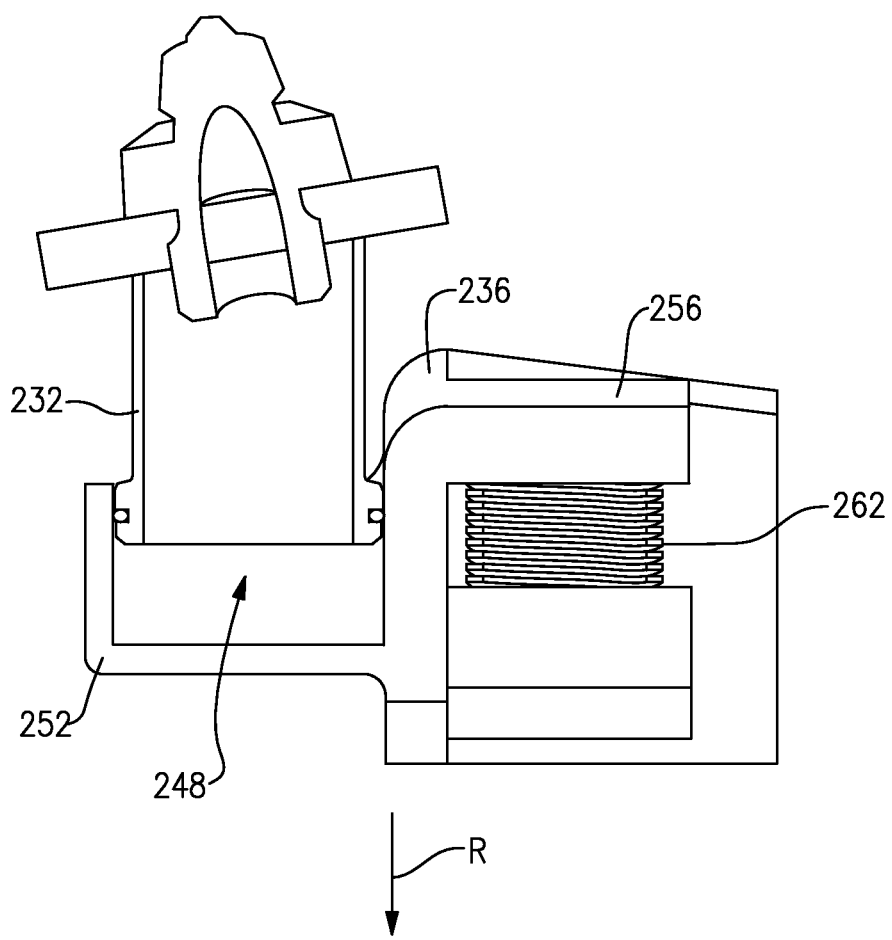
FIG. 7 shows a cross-sectional view through a pneumatic chamber of the flow control device of FIG. 6B.

Referring now to FIGS. 6A, 6B and 7, the door 236 is a louvered door and includes three arcuate louvers that align with fins 238 of the heat exchanger 134 when the door 236 is in a position that permits more flow (FIG. 6B) and is aligned with openings O between the fins when the door is in a position that restricts flow through the heat exchanger 134 (FIG. 6A). The louvers are radially spaced from each other.

In this example, leading edges of the louvers 240 have a rounded profile. When in the flow permitting position, the louvers 240 of the example door 236 form an airfoil cross-shaped cross-sectional profile with the fins 238 relative to a direction of flow of the bypass flow B1.

In another example, the louvers, and the remainder of the door, is generally planer, such as in the example flow control assembly 210 of FIGS. 4A and 4B.

During operation, the compressed air supply communicates air to an expandable pneumatic chamber 248. The compressed air causes a cup portion 252 of the door 236 to move radially inward in a direction R. Movement of the cup portion 252 radially inward moves the remaining portions of the door 236 radially inward. Movement of the cup portion 252 also moves flange 256 of the door 236 to compress a mechanical spring 262. When less flow through the heat exchanger 134 is desired, the expandable pneumatic chamber 248 is depressurized causing the biasing force of the spring 262 to move against the flange 256 and force the door 236 to move to the position that permits less flow of FIG. 6A.

In this example, pressurized air is used to move the door 236. In other examples, oil, fuel, or both could be used. In still other examples, the door 236 could be moved mechanically. In still other examples, the door 236 could be moved passively using, for example, core flow C to move the door 236. In such an example, as the pressure of the core flow C increases, the pressure will reach a threshold where the pressure overcomes, for example, spring biasing force holding the door 326 closed. Overcoming the spring biasing force allows the core flow C to open the door 236.

In this example, pressurized air causes the door 236 to move to a position that permits more flow through the heat exchanger 134. The door 236 is spring biased toward the position that permits less flow through the heat exchanger 134. In another example, the spring bias may be reversed and the pressurizing of the expandable pneumatic chamber 248 may cause the door 236 to move from a flow restricting position to a flow permitting position.

In this example, the door 236 is moved by pressurizing two expandable pneumatic chambers 248. One of the chambers is on a first circumferential side of the door 236. The other chamber is on an opposing, second side of the door 236.

The chambers 248 moves the door 236 and the spring 262 moves the door 236 in another direction. In other examples, the spring 262 is not used. Instead, one chamber is used to move the door 236 in one direction, and the other chamber is used to move the door 236 in the other direction.

The door 236, as can be appreciated, moves along a generally radially extending axis. In other examples, the door may move or rotate between positions along another axis or path.

The door 236 is positioned near an inlet to the heat exchanger 134 for the bypass flow B1. The inlet represents the portion of the heat exchanger 134 where the bypass flow air B1 enters. In another example, the door 236 may be positioned elsewhere relative to the heat exchanger 134, such as near an outlet 266 (FIG. 5) of the heat exchanger 134.

Flow entering the heat exchanger 134 through the door 236 is flow from the bypass flow path B1. This flow exits the heat exchanger 134 and moves directly into the bypass flow path B2. In other examples, the flow exits the heat exchanger 134 and moves directly back into the bypass flow path B1.

In still other examples, flow entering the heat exchanger 134 through the door 236 is flow from the bypass flow path B2. This flow exits the heat exchanger 134 and moves directly into the bypass flow path B2.

Referring now to FIGS. 8A and 8B, in another example, a solenoid 300 is energized to move a door 306 from a position that permits flow (FIG. 8A) to a position that restricts flow (FIG. 8A) through a heat exchanger 310. A mechanical spring 314 can be utilized to bias the door 306 to a position that permits flow. The spring 314 may be used to bias the door 306 in another direction in other examples.

The solenoid 300 is operatively coupled to a controller 318, which commands the solenoid 300 to energize to open for passage of air into the heat exchanger 310 through the door 306 and de-energizes to close the door 306 and prevent against passage of air into the heat exchanger 310.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

I claim:

1. A flow control assembly, comprising:
   a heat exchanger including fins and openings between the fins, wherein the heat exchanger includes an arcuate profile;
   a door that is moved to control flow through the heat exchanger, wherein the door includes a plurality of arcuate louvers corresponding to the arcuate profile of the heat exchanger and the door is aligned with the fins of the heat exchanger when the door is positioned to allow more flow through the openings between the fins and the door is aligned with the openings between the fins when the door is in a position to restrict flow through the heat exchanger; and
   a pneumatic device including a first expandable pneumatic chamber positioned on a first circumferential side of the heat exchanger and a second expandable pneumatic chamber positioned on a second circumferential side of the heat exchanger to move the door.

2. The assembly of claim 1, wherein the door is at an inlet to the heat exchanger and the arcuate louvers extend in a circumferential direction and follow a curvature in the circumferential direction.

3. The assembly of claim 1, wherein the pneumatic device is configured to move the door from a position that permits more flow through the heat exchanger to a position that permits less flow through the heat exchanger.

4. The assembly of claim 3, including a spring configured to move the door from the position that permits less flow through the heat exchanger to the position that permits more flow through the heat exchanger.

5. The assembly of claim 1, wherein the pneumatic device is configured to move the door from a position that permits less flow through the heat exchanger to a position that permits more flow through the heat exchanger.

6. The assembly of claim 5, including a spring configured to move the door from the position that permits more flow through the heat exchanger to the position that permits less flow through the heat exchanger.

7. The assembly of claim 1, wherein the fins include an arcuate profile and follow a curvature in a circumferential direction.

8. A gas turbine engine, comprising:
a fan to deliver air into a main bypass flow outer housing, and into a third stream bypass flow outer housing that is radially outwardly of the main bypass flow outer housing;
a core engine outer housing radially inward of the main bypass flow outer housing, the core engine outer housing enclosing a compressor section and a turbine section;
at least one duct of the main bypass flow outer housing, the at least one duct extending radially outwardly into the third stream bypass flow outer housing to provide additional flow area at a circumferential location of the at least one duct;
a heat exchanger at least partially disposed within the at least one duct including fins and openings between the fins; and
a door configured to move to control flow through the heat exchanger, wherein the door includes a plurality of arcuate louvers extending in a circumferential direction and the door is aligned with the fins of the heat exchanger when the door is positioned to allow more flow through the openings between the fins and the door is aligned with the openings between the fins when the door is in a position to restrict flow through the heat exchanger, wherein the door is configured to move in response to pneumatic pressure in a first expandable pneumatic chamber positioned on a first circumferential side of the heat exchanger and pneumatic pressure in a second expandable pneumatic chamber positioned on a second circumferential side of the heat exchanger.

9. The gas turbine engine of claim 8, wherein compressed air from the compressor section provides the pneumatic pressure.

10. The gas turbine engine of claim 8, including a solenoid to move the door.

11. The gas turbine engine of claim 8, wherein the door is positioned at an outlet to the heat exchanger.

12. The gas turbine engine of claim 8, wherein the door is configured to passively move to control flow through the heat exchanger.

13. The gas turbine engine of claim 8, wherein the heat exchanger is configured to communicate thermal energy from an engine core to flow moving through the heat exchanger from the third stream bypass flow.

14. The gas turbine engine of claim 8, wherein the fins include an arcuate profile and follow a curvature in the circumferential direction.

15. A method of controlling flow through a heat exchanger of a gas turbine engine, comprising:
pressurizing a chamber to move a door; and
moving the door to increase or decrease flow through the heat exchanger having fins and openings between the fins and the heat exchanger includes an arcuate profile, wherein the door includes a plurality of arcuate louvers corresponding to the arcuate profile of the heat exchanger and the door is aligned with the fins of the heat exchanger when the door is positioned to allow more flow through the openings between the fins and the door is aligned with the openings between the fins when the door is in a position to restrict flow through the heat exchanger, wherein pressurizing the chamber to move the door includes pressurizing a first expandable pneumatic chamber positioned on a first circumferential side of the heat exchanger and pressurizing a second expandable pneumatic chamber positioned on a second circumferential side of the heat exchanger.

16. The method of claim 15, including circulating thermal energy from a core of the gas turbine engine through the heat exchanger.

17. The method of claim 16, including circulating bypass flow through the heat exchanger.

18. The method of claim 16, including pressurizing the chamber to move the door along a radially extending axis of the gas turbine engine and the arcuate louvers extend in a circumferential direction and follow a curvature in the circumferential direction.

19. The method of claim 15, wherein the fins include an arcuate profile and follow a curvature in a circumferential direction.

* * * * *